United States Patent [19]

Mizuno et al.

[11] Patent Number: 5,223,585
[45] Date of Patent: Jun. 29, 1993

[54] HEAT-RESISTANT FILM AND PRODUCTION PROCESS THEREOF

[75] Inventors: Toshiya Mizuno; Yoshikichi Teramoto; Takeshi Saito, all of Tsuchiura; Juichi Wakabayashi, Ibaraki, all of Japan

[73] Assignee: Kureha Kagaku Kogyo K. K., Tokyo, Japan

[21] Appl. No.: 787,860

[22] Filed: Nov. 5, 1991

Related U.S. Application Data

[60] Division of Ser. No. 508,512, Apr. 13, 1990, Pat. No. 5,095,078, which is a continuation of Ser. No. 282,457, Dec. 9, 1988, abandoned.

Foreign Application Priority Data

Dec. 16, 1987 [JP] Japan .................. 62-316306

[51] Int. Cl.$^5$ .............. C08G 14/00; C08L 61/00
[52] U.S. Cl. .................... 525/471; 525/537; 264/290.2
[58] Field of Search ............ 525/537, 471; 264/290

[56] References Cited

U.S. PATENT DOCUMENTS

| | | | |
|---|---|---|---|
| 4,734,470 | 3/1988 | Kawabata et al. | 525/537 |
| 4,775,571 | 10/1988 | Mizuno et al. | 528/388 |
| 4,826,906 | 5/1989 | Satake et al. | 525/471 |
| 4,980,114 | 12/1990 | Satake et al. | 525/537 |

FOREIGN PATENT DOCUMENTS

| | | |
|---|---|---|
| 7137116 | 8/1982 | Japan . |
| 5863417 | 4/1983 | Japan . |
| 6093625 | 5/1985 | Japan . |
| 613417 | 2/1986 | Japan . |
| 6137418 | 2/1986 | Japan . |
| 6137419 | 2/1986 | Japan . |

Primary Examiner—John C. Bleutge
Assistant Examiner—Helen F. Lee
Attorney, Agent, or Firm—Lowe, Price, LeBlanc & Becker

[57] ABSTRACT

Disclosed herein is a heat-resistant film obtained by biaxially-stretching a composition which comprises (A) 50-90 parts by weight of a polyetheretherketone having predominant recurring units of the formula:

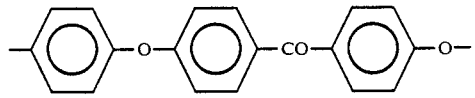

and (B) 50-10 parts by weight of a substantially linear poly(arylene sulfide) having melt viscosity of at least 1,000 poises. A production process of such a heat-resistant film is also disclosed, which comprises biaxially stretching the above composition in a temperature range at least equal to the crystallization temperature (Tc) of the poly(arylene sulfide) but not higher than the crystallization temperature (Tc) of the polyetheretherketone.

3 Claims, 1 Drawing Sheet

HEAT-RESISTANT FILM AND PRODUCTION PROCESS THEREOF

This application is a division of application Ser. No. 07/508,512 filed Apr. 13, 1990, now U.S. Patent No. 5095078 which is a continuation of Ser. No. 07/282,457, filed Dec. 9, 1980, now abandoned.

FIELD OF THE INVENTION

This invention relates to a film excellent in heat resistance, and more specifically to a biaxially-stretched heat-resistant film made of a composition, which comprises a polyetheretherketone and a poly(arylene sulfide), and also to a production process thereof. The heat-resistant film of this invention can be used suitably, especially, in the field of electronic and electrical industry for its superb solder heat resistance, mechanical strength, surface smoothness, dimensional stability, electrical characteristics, moisture resistance, flex resistance, transparency, etc.

BACKGROUND OF THE INVENTION

Various polymer films have been used widely in the field of electronic and electrical industry. They are often soldered when used as electrical parts or devices. As electrical parts making use of a polymer film, capacitor films and flexible printed circuit boards may be mentioned by way of example. Incidentally, when soldering an electrical part, the temperature of fused solder reaches as high as about 260° C. There are however not many polymer films which can withstand such a high-temperature processing. On the other hand, those having excellent solder heat resistance are costly and hence involve a practical problem as industrial materials from the economical viewpoint.

Flexible printed circuit boards (FPC) with electronic parts mounted thereon, such as IC, are required to have good service properties such as high heat resistance, moisture resistance, flex resistance, nonflammability, copper peeling resistance and the like. Most of these service properties are however dependent on the corresponding properties of the polymer film employed as a base material. The utility of polymer films is expected to expand further to such fields as requiring a high level of heat resistance, for example, insulating films for motors and transformers.

For example, polyimide films have a glass transition temperature of 350° C. or higher and hence possess sufficient heat resistance. Polyimide resins however do not have any melting point and lack melt flowability, so that they cannot be formed into films by any conventional biaxial stretching process. Moreover, they are inferior in moisture resistance, adhesion properties, and heat sealability.

Similarly, poly(arylene sulfides) which may hereinafter be abbreviated as "PASs", such as poly(phenylene sulfide) which may hereinafter be abbreviated as "PPS", can hardly be regarded as resins having sufficient solder heat resistance.

As a heat-resistant resin having the highest glass transition point (Tg) among crystallizable melt-forming materials, polyetheretherketone which may hereinafter be abbreviated as "PEEK" has recently been developed. A great deal of work is now under way with a view toward achieving its practical use. It has however been considered difficult to stably obtain stretched films of excellent mechanical strength from PEEKs on an industrial scale because PEEKs contain aromatic rings in its backbone, its molecular chain is stiff and its stretchability is thus poor. It has therefore been proposed to roll a PEEK resin film or sheet by pressure rolls while applying a backward tension (Japanese Patent Laid-Open Publication No. 137116/1982). It has also been proposed to thermally set a film obtained in the above manner, thereby providing a base film for perpendicular magnetization (Japanese Patent Laid-Open Publication No. 93625/1985). PEEKs have a high crystalline melting point (about 340° C.) and a high viscosity. Therefore, it is generally necessary to conduct its melt extrusion at an elevated temperature of 370°-420° C. Moreover, PEEKs have a high viscosity and is accordingly subjected to high shear stress. PEEK resin articles molded under such conditions therefore contain heat deterioration products at high concentrations In many instances, heat deterioration products may not develop too much problems in molded articles which do not require stretching. They however develop extremely serious problems from the practical viewpoint where stretching is applied as in biaxially-stretched films. The existence of such heat distortion products becomes a serious problem, especially, in capacitor films and base films for FPCs, because smoothness is required for such films. In addition, PEEKs use 4,4'-difluorobenzophenone which is a relatively expensive raw material, and are hence costly. Use of these resins alone is therefore not advantageous from the economical standpoint.

On the other hand, polymer alloys formed by blending PEEK and PAS together have also been proposed (Japanese Patent Laid-Open Publication No. 172954/1982). Poly(phenylene sulfide) which has heretofore been used as a PAS has however been cross-linked (cured) for molding purposes, so that it cannot be formed into films. As a matter of fact, the above publication is silent about the formation of the polymer alloys into films. It has also been proposed to form a polymer alloy of PEEK and PAS into a sheet and to use it as a lining material or coating material for bearings (Japanese Patent Laid-Open Publication No. 160352/1983). However, it is not disclosed at all to form the polymer alloy into a biaxially-stretched film.

It has heretofore been difficult to conduct stable extrusion of a PAS/PEEK blend film, since the polymerization degree of a PAS is low and even if its blending with a PEEK having a high melting point is attempted, the melt viscosity of the PAS is so low at the melting point (about 380° C.) of the PEEK that their mixing is poor and the melt extrusion of the resultant blend is unstable. Moreover, any attempt of biaxial stretching of the resulting film failed to achieve sufficiently stable biaxial stretching. No evaluation has therefore been made on biaxially-stretched films obtained in the above manner.

OBJECTS AND SUMMARY OF THE INVENTION

An object of this invention is to provide a heat-resistant film having excellent solder heat resistance and also superb properties in mechanical strength, surface smoothness, dimensional stability, electrical characteristics, moisture resistance, flex resistance and transparency.

Another object of this invention is to produce a heat-resistant film, which has practical utility from physical and economical standpoints, by melt-extruding a composition of PEEK and PAS while suppressing heat deterioration and then conducting stable biaxial stretching.

With the foregoing in view, the present inventors tried to blend a new, substantially linear PAS of a high molecular weight (high viscosity) with a PEEK. It was possible to form a sheet from their blend, but the resultant sheet had two crystallization temperatures and two crystalline melting points which correspond respectively to the crystallization temperatures and crystalline melting points (Tm) of the PAS and the PEEK. The term "crystallization temperature" as used herein means a temperature at which exothermic crystallization takes place in a temperature-raising course. It is generally abbreviated as "Tc" or "Tc₁", and is distinguished from a melt crystallization temperature "Tmc" or "Tc₂" at which exothermic crystallization takes place in a temperature-lowering course. Although it appeared that the blending was still insufficient and the resultant blend would not be formable into a film, a film-forming experiment was conducted daringly. It has surprisingly be found that stretching is feasible in a stretching temperature range at least equal to the crystallization temperature (Tc, 130°-140° C.) of the PAS but not higher than the crystallization temperature (Tc, 165°-185° C.) of the PEEK, preferably, at a temperature (140°-150° C.) somewhat higher than the crystallization temperature of the PAS. It has also been found that transverse stretching is feasible at substantially the same temperature and the resulting biaxially-stretched film can still be set thermally to a sufficient degree at about 340° C. which is close to the melting point (Tm) of the PEEK. The present invention has been completed on the basis of these findings In one aspect of this invention, there is thus provided a heat-resistant film obtained by biaxially-stretching a composition which comprises (A) 50-90 parts by weight of a polyetheretherketone having predominant recurring units of the formula:

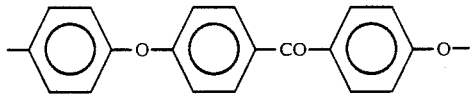

and (B) 50-10 parts by weight of a substantially linear poly(arylene sulfide) having melt viscosity of at least 1,000 poises.

In another aspect of this invention, there is also provided a process for the production of a heat-resistant film, which comprises biaxially stretching a composition, said composition comprising (A) 50-90 parts by weight of a polyetheretherketone having predominant recurring units of the formula:

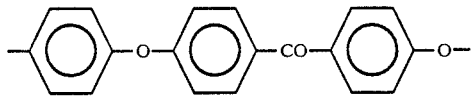

and (B) 50-10 parts by weight of a substantially linear poly(arylene sulfide) having melt viscosity of at least 1,000 poises, in a temperature range at least equal to the crystallization temperature (Tc) of the poly(arylene sulfide) but not higher than the crystallization temperature (Tc) of the polyetheretherketone.

DETAILED DESCRIPTION OF THE INVENTION

Figure 1:
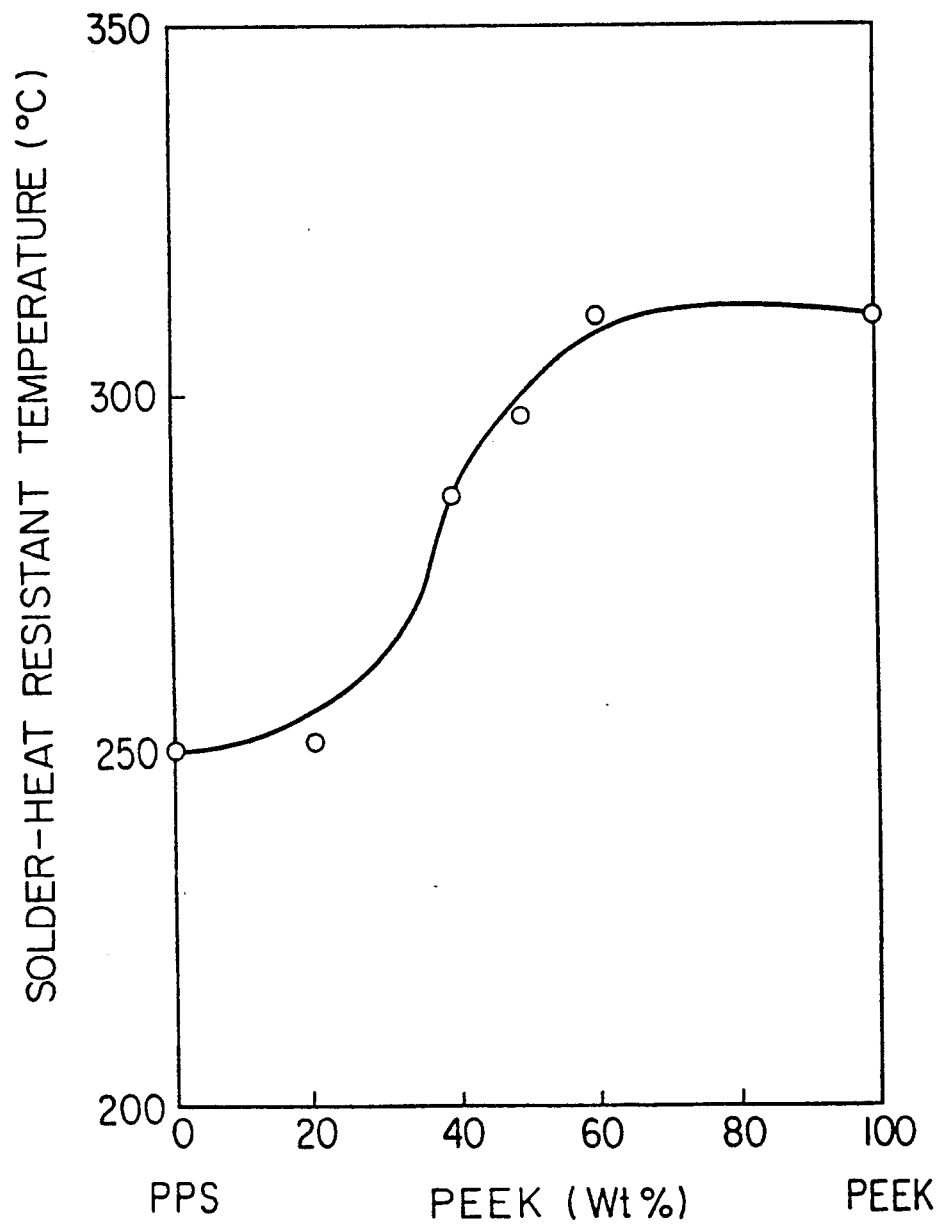
FIG. 1 diagrammatically illustrates the solder-heat resistant temperature of biaxially-stretched films made of a PEEK resin, a PAS resin, and their compositions respectively.

The essential elements of this invention will hereinafter be described.

Polyetheretherketone

Polyetheretherketones (PEEKs) useful in the practice of this invention have predominant recurring units of the formula:

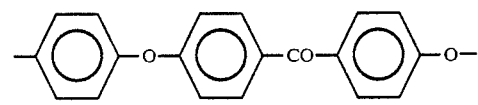

A PEEK can be obtained by a well-known process such as the desalting polycondensation reaction of a bisphenol such as hydroquinone and a dihalobenzoid compound such as 4,4'-difluorobenzophenone (U.S. Pat. No. 4,176,222).

In general, the glass transition point (Tg) and melting point of a PEEK are about 140°-145° C. and about 330°-345° C. respectively In this invention, the PEEK may contain a small amount of another aryl ketone or aryl ether as an additional component. In such a case, the glass transition point and melting point may vary within ±10° C. or so.

Poly(arylene sulfide)

The poly(arylene sulfide) used in this invention is a substantially linear poly(arylene sulfide) whose melt viscosity is at least 1,000 poises but is not higher than 50,000 poises. Such a PAS resin must be sufficiently melt-stable and highly flowable in the processing temperature range of the PEEK.

Such a PAS can be obtained, for example, by the process described in Japanese Patent Laid-Open Publication No. 7332/1986.

In order to permit the formation of a biaxially-stretched film, a PAS resin employed in the practice of this invention should be a substantially-linear and high-molecular PAS having a melt viscosity of at least 1,000 poises as measured at 310° C. and a shear rate of 200 sec⁻¹, preferably, 2,500-30,000 poises Here, the expression "'substantially-linear' and high-molecular PAS" does not mean such a polymer as obtained through thickening (curing) by oxidative crosslinking but does mean a polymer obtained from a monomer composed principally of a substantially bifunctional monomer.

Even if a polymer alloy is formed with a PEEK, it is inferior in film-forming property and cannot provide a biaxially-stretched film stably provided so long as the melt viscosity of the PAS is lower than 1,000 poises. Such a substantially-linear and high-molecular PAS can be suitably obtained by reacting an alkali metal sulfide and a dihalogenated aromatic compound in the presence of water in an organic amide solvent such as N-methyl-pyrrolidone by a particular two-stage heat-up polymerization process as disclosed in Japanese Patent Laid-Open Publication No. 7332/1986 referred to above.

As exemplary alkali metal sulfides, may be mentioned lithium sulfide, sodium sulfide, potassium sulfide, rubidium sulfide, cesium sulfide, and mixtures thereof.

Illustrative examples of the dihalogenated aromatic compound include p-dichlorobenzene, m-dichlorobenzene, 2,5-dichlorotoluene, p-dibromobenzene, 2,6-dichloronaphthalene, 1-methoxy-2,5-dichlorobenzene, 4,4'-dichlorobiphenyl, 3,5-dichlorobenzoic acid, p,p'-dichlorodiphenyl ether, 4,4'dichlorodiphenyl sulfone, 4,4'-dichlorodiphenyl sulfoxide, 4,4'-dichlorodiphenyl ketone, and mixtures thereof.

PASs useful in the practice of this invention are substantially linear. Of these, poly(p-phenylene sulfide) and poly(p-phenylene sulfide) copolymers containing m-phenylene sulfide unit as a minor component are preferred.

The term "poly(arylene sulfide) (PAS)" will hereinafter always mean a substantially linear PAS resin of a high molecular weight unless otherwise specifically indicated.

Composition of PEEK resin and PAS resin

The blending proportions of the PEEK resin and PAS resin in this invention are 50-90 parts by weight and 50-10 parts by weight respectively. Preferably, their proportions may be 55-80 parts by weight and 45-20 parts by weight respectively. If the proportion of the PEEK resin is to high, the resin generates significant shearing heat upon melt extrusion so that considerable formation of heat deterioration products of the PAS takes place. The resulting film is hence not suited for actual use. Further, the electrical dielectric loss (tan δ) in a high temperature range of 160° C. and higher, especially, around 180° C. increases close to 2%. Generation of substantial heat is therefore expected if such a film is used, for example, in an a.c. capacitor which is used in such a temperature range. In addition, from the economical standpoint, use of the expensive PEEK resin in a higher proportion results in a more expensive film. It is therefore not preferable to use the PEEK resin in a high proportion. If the PAS resin is too much on the contrary, the resultant film is lowered in heat resistance and the melt extrusion of the resulting composition becomes unstable. It is hence not preferred to use the PAS resin in such a high proportion.

Although no particular limitation is imposed on the manner of blending, it is generally suitable to fuse and blend a predetermined amount of the PEEK resin in the form of pellets or powder and another predetermined amount of the PAS resin in the form of pellets or powder. The melting temperature at the time of extrusion may preferably be 350°-400° C. If the melting temperature is lower than 350° C., the melting of the PEEK resin is insufficient and in spite of the existence of the PAS resin, the resultant composition has a high viscosity thereby to develop inconvenience such that melt fractures are formed upon melt extrusion. On the other hand, the melt stability of the PAS resin is not fully sufficient when the temperature is higher than 400° C.

Incidentally, one or more of other thermoplastic resins, various fillers, pigments and the like may also be incorporated to an extent not impairing the objects of this invention. As exemplary thermoplastic resins, may be mentioned aromatic polysulfones, polyetherketones, aromatic polycarbonates and aromatic polyhydroxyethers. On the other hand, talc, mica, kaolin, silica, titanium oxide, calcium carbonate, glass beads, carbon and the like may be mentioned as fillers and pigments.

Biaxial stretching method

The composition of the PEEK and PAS resins is biaxially stretched and thermally set by a conventional melt film-forming process. The composition is either extruded or pressed into a sheet-like form in a molten state, followed by quenching into an amorphous sheet. Thereafter, the amorphous sheet is biaxially stretched by stretching or rolling. As a biaxial stretching method, either the simultaneous biaxial stretching method or the sequential biaxial stretching method may be used. Incidentally, a sheet obtained from a composition of PEEK and PAS resins has, in many instances, two crystallization temperatures and two crystalline melting points corresponding to the respective crystallization temperatures (Tc) and crystalline melting points (Tm) of the PAS and PEEK resins. The PEEK and PAS resins therefore exhibit incomplete compatibility.

As a matter of fact, the melting point (Tm) of a PEEK resin is around about 340° C. while that of a high-viscosity PAS resin is about 280° C. or so. Their difference is hence rather great, namely, about 60° C. or more. On the other hand, the processing temperature of a resin is generally 20°-30° C. higher than its melting point (Tm). The high-viscosity PAS resin is usually melt-extruded at 300°-340° C. accordingly. Since the melt viscosity of the PAS resin is too low at the processing temperature for the PEEK resin, it is believed to be reasonable, even in view of the difference in processing temperature alone, to consider that the blend of the PEEK and PAS resins cannot be melt-extruded stably into a sheet and further cannot stably provide a biaxially-stretched film.

Biaxial stretching of a thermoplastic resin is generally effected by stretching an unstretched film or sheet in both machine and transverse directions at a temperature in a range not higher than the melting point of the resin but at least its glass transition point (Tg). For biaxial stretching of a PAS resin which is a resin having a high crystallization velocity, it is however necessary to conduct the biaxial stretching at a temperature higher than its Tg but lower than its crystallization temperature (Tc), usually, at a temperature of 90°-110° C. which is a little bit higher than its Tg, and in order to obtain a uniform film, to control the temperature conditions within an extremely narrow range. If the stretching temperature exceeds the crystallization temperature of the PAS resin, crystallization begins to take place in the course of the film-making step so that a uniform film can hardly be obtained. In order to stretch a film or sheet of a PEEK resin on the other hand, a relatively high temperature (about 150°-180° C.) is required. Here again, a precise control of the temperature range is indispensable.

A further description will next be made of Tg, crystallization temperature and crystalline melting point. When measured at a heating rate of 10° C./min by a differential scanning calorimeter (DSC), the Tg, crystallization temperature and crystalline melting point of a high-viscosity PPS resin as a typical example of PAS resins are about 85° C., about 135° C. and 280° C. respectively, while those of a PEEK resin are about 140° C., about 175° C. and about 340° C. respectively. The crystallization temperature (Tc) of a sheet, which has been obtained by blending the PPS and PEEK resins and then melt-extruding the resultant composition at about 370° C., has two peaks, one at about 135° C. and the other at about 170° C. The former and latter peaks are attributed to the PAS resin and PEEK resin respectively. Regarding its melting point, two peaks also appear, one at about 280° C. and the other at about 340° C. These peaks are also attributed to the PAS resin and PEEK resins respectively. It is hence understood that these resins show only incomplete compatibility. A composition of resins which exhibit such incomplete compatibility only has generally been considered to involve extreme difficulties for its biaxial stretching or to permit not biaxial stretching. In particular, in view of the fact that the stretching temperature (at least equal to Tg) of the PEEK resin is substantially equal to or somewhat higher than the crystallization temperature (Tc) of the PAS resin, it has been expected that when a composition showing incomplete mixing of these resins is stretched at the stretching temperature of the PEEK resin, crystallization of the PAS resin starts and the formation of the composition into a film is thus either impossible or extremely difficult.

It has however been found that when the resin composition is stretched at a temperature in a range of from the crystallization temperature of the PAS resin to the crystallization temperature of the PEEK resin, preferably, at 140° C.–150° C., its stable biaxial stretching is feasible. Since the crystallization temperature of the PAS resin is very close to the glass transition point (Tg) of the PEEK resin, it may be said that the composition can be biaxially stretched at the stretching temperature of the PEEK resin. As already described above, this stretching temperature is higher than the crystallization temperature of the PAS resin, and as a stretching temperature for the PAS resin, it is too high to facilitate the formation of the PAS resin into a film.

Regarding further to the peak of a crystallization temperature (Tc) in a diagram obtained by DSC, let's express the ratio of the half value width of the peak to the height of the peak in terms of broadened index which may hereinafter be abbreviated as "B.I.". The broadened indices (B.I.) of PAS resins alone range from 0.05 to 0.25. A PAS/PEEK composition can give a film excellent in heat resistance when formed into a biaxially-stretched film, provided that B.I. of the peak of a crystallization temperature attributable to the PAS resin, which appears in a diagram of the composition, falls within a range of 0.35–5.00.

B.I may be used as an indication for the interaction between PAS resin and PEEK resin. Namely, it is believed that a smaller B.I. indicates smaller interaction, the PAS resin hence exists independently in the PEEK resin, and this independent existence of the PAS resin allows the PAS resin to undergo smooth crystallization at a certain specific temperature without being affected by the surrounding PEEK resin. From this interpretation, it is understood that as B.I. increases, the PAS resin is more affected by the PEEK resin, in other words, the PAS resin is dispersed in smaller particles and more fully surrounded by the PEEK resin. If the PAS resin is in the form of sufficiently small particles and the composition has such a structure that the PAS resin is fully surrounded by the PEEK resin, the resulting film as a macro-structure is believed to show the heat resistance of the PEEK resin alone. However, if the PAS resin is dispersed so minute that the crystallization of the PEEK resin is impaired, it is believed that the PEEK resin is unable to exhibit its inherent heat resistance and the heat resistance of the resultant film is lowered.

B.I. tends to become smaller when melt-blending conditions are insufficient. B.I. also becomes smaller when the PAS resin is contained in a higher proportion in the resin composition.

The biaxially-stretched film according to this invention can be thermally set at a temperature near the melting point of the PEEK resin, namely, around about 340° C.

Although a PEEK/PAS blend shows incomplete intimateness, it can be biaxially stretched in a temperature range slightly lower than the stretching temperature of the PEEK resin and nevertheless has heat resistance close to the PEEK resin. Stretching conditions in this invention will next be summarized.

Melt extrusion may desirably be conducted in a temperature range of 350°–400° C., because melting of the PEEK resin is insufficient at temperatures lower than 350° C. and in spite of the inclusion of the PAS resin, the blend has a high viscosity and develops inconvenience such as melt fracture upon melt extrusion and the melt stability of the PAS resin is not fully sufficient at temperatures higher than 400° C.

The stretching temperature is in a temperature range of from the crystallization temperature of the PAS resin to the crystallization temperature of the PEEK resin, in particular, the glass transition temperature of the PEEK resin or in a temperature range slightly higher than the glass transition temperature. Of these, a range of 140°–150° C. is particularly preferred. It is believed that the existence of a certain degree of interaction between the PAS resin and PEEK resin in their composition as demonstrated by its B.I. serves, on one side, to suppress abrupt crystallization of the PAS resin and on the other side, to create a temperature range in which mobility is imparted to the molecules of the PEEK resin, whereby stretching has been rendered feasible in the temperature range.

The draw ratio may be at least 4, preferably, 6–12 in terms of area ratio. The draw ratio in the machine direction may preferably be 2.0–3.5, while the preferable draw ratio in the transverse direction may be 2.0–4.0. If the draw ratio in the machine direction is smaller than 2.0, there is a tendency that the stretching becomes uneven and the thickness varies in the machine direction. If stretching is effected at a draw ratio greater than 3.5 times, oriented crystallization takes place so that it becomes difficult to conduct stable transverse stretching. If the draw ratio is smaller than 2.0 in the transverse direction, the stretching in the transverse direction is also insufficient so that after heat treatment, the resultant film does not have sufficient strength or is susceptible to splitting. On the other hand, transverse draw ratios greater than 4.0 cannot provide sufficient running stability upon film-forming.

On the other hand, the heat setting temperature may preferably be 250°–350° C. Especially, 280–340° C. or so is preferred in view of physical properties of the resulting film, such as solder heat resistance.

The thickness of the biaxially-stretched film is generally 1–150 μm. The thickness varies depending on the application field of the film. For example, 1–20 μm is preferred for capacitor films and 15–125 μm are desirable for flexible printed circuit plates.

Heat-resistant film

The biaxially-stretched film according to this invention is excellent in solder heat resistance, as readily understood from the fact that its shrinkage factor in a solder bath (260° C.×10 seconds) is as small as 0–5%. Its surface roughness Ra (μm) is not greater than 0.10, preferably, 0.05 or smaller, while its coefficient of dynamic friction is not greater than 0.8, preferably, 0.6 or smaller. It is hence excellent in surface smoothness. Formation of fish-eyes is less compared to biaxially-stretched films of a PEEK resin alone. Moreover, the biaxially-stretched film of this invention is also excellent in mechanical strength, dimensional stability, electrical characteristics, moisture resistance, flex resistance, transparency, surface smoothness, processability, cost, etc.

Biaxially-stretched films according to this invention can be used widely in fields where a high degree of heat resistance is required, for example, in the field of electronic and electric industry, for example, as capacitor films, flexible printed circuit boards, base films for magnetic films, etc.

Measurement method of crystallization temperature, etc.

In this invention, the glass transition temperatures (Tg), crystallization temperatures (Tc) and crystalline melting points (Tm) of PEEK resins and PAS resins as well as those attributed to the PEEK resin components and PAS resin components in their resin compositions were all measured at a heating rate of 10° C./min by means of a differential scanning calorimeter (DSC) as described above.

Each measurement by DSC in this invention was conducted by using "TA3000 System, DSC30 Model" (trade name; manufactured by Metler Company) and raising the temperature from room temperature to 380° C. at a temperature scanning gradient of 10° C./min and a sample weight of 10 mg. The value of a point of inflection to the endothermic side was employed as Tg, the peak value of a peak on the exothermic side was used as Tc, and the peak value of a peak on the endothermic side was adopted as Tm. Each sample was used in the form of pellets.

Regarding each broadened index (B.I.), the half value width and height of the peak of crystallization temperature (Tc) in the corresponding DSC diagram were measured and the "ratio of the half value width of the peak to the height of the peak" was calculated. The thus-calculated value was used as B.I.

ADVANTAGES OF THE INVENTION

Heat-resistant films according to this invention are excellent in solder heat resistance, mechanical strength, surface smoothness, dimensional stability, electrical characteristics, moisture resistance, flex resistance, transparency, etc., and their costs are lower than those of films obtained from PEEK resins alone. The production process of this invention permits stable melt extrusion of a PEEK/PAS composition, whereby biaxially-stretched heat-resistant films of excellent quality can be obtained.

EMBODIMENTS OF THE INVENTION

The present invention will hereinafter be described specifically by the following Examples and Comparative Examples. It should however be borne in mind that the present invention is not necessarily limited to these Examples only.

EXAMPLES 1 AND COMPARATIVE EXAMPLES 1–2

Forty parts by weight of powder of poly(p-phenylene sulfide) (PPS resin produced by Kureha Chemical Industry Co., Ltd.; melt viscosity: 6,800 poises; Non-Newtonian coefficient: 1.3) and 60 parts by weight of a PEEK resin ("Victrex", trade mark; product of Imperial Chemical Industry, Ltd.) were blended, molten and kneaded at 370° C. in an extruder, and pelletized.

Under the following conditions, the resultant pellets were extruded and formed into a biaxially-stretched film.

The pellets were molten and extruded at 370° C. into a sheet. After preheating the sheet by metal rolls whose surface temperatures were controlled at about 100° C., the preheated sheet was stretched 2.5 times between rolls controlled at 145° C. The resulting film was then introduced into a tenter and was stretched 3.5 times in the transverse direction by a tenter stretching machine in an atmosphere controlled at a hot air temperature of 145° C. After the stretching, the sheet was fed via a buffer zone to a thermal setting zone in which the sheet was immediately subjected to heat setting at a hot air temperature of 290° C. The percent relaxation in the transverse direction at that time was 5%. The thickness of the film was 10 μm. This film will be called "Film (I)".

As a result of DSC measurement, Tc of the PEEK resin component and Tc of the PPS resin component in the above pellets were 167° C. and 135° C. respectively, and the B.I. value of the peak of Tc attributable to the PPS resin component was 1.0. On the other hand, it was unable to clearly distinguish Tg of the PEEK resin component because it overlapped with the peak of Tc of the PPS resin component.

Physical date of Film (I) were measured. Results are summarized in Table 1. For the sake of comparison, physical properties were also measured on each of biaxially-stretched films obtained from the PPS resin (Comparative Example 1) and PEEK resin (Comparative Example 2) respectively. Results are also given in Table 1. Incidentally, the PPS resin and PEEK resins were also measured by DSC in a similar manner. The B.I. values of the peaks of their crystallization temperatures (Tc) were 0.2 and 0.13 respectively.

EXAMPLE 2

Film (I) produced in Example 1 was fixed along its entire periphery by a square metal frame and then heat set for 10 minutes in a Geer oven of 340° C. Physical properties of the resultant film are also given in Table 1.

EXAMPLE 3

Film (I) produced in Example 1 was subjected to free heat shrinkage in both transverse and machine directions on metal rolls controlled at 280° C. while allowing it to slip on the rolls, followed by its take-up. Physical properties of the film are given in Table 1.

EXAMPLE 4

Using the PPS resin and PEEK resin employed in Example 1, a biaxially-stretched film was obtained in a similar manner as in Example 1 except that the blending ratio of PEEK resin/PAS resin was changed to 8/2. The thus-obtained film was fixed on a metal frame and heat set at 340° C. for 10 minutes in a similar manner as in Example 2. Its physical properties were measured. Results are also given in Table 1. In addition, a DSC measurement was conducted using pellets of the resin composition as a sample. As a result of the DSC measurement, Tc of the PEEK resin component and Tc of the PPS resin component were 168° C. and 135° C. respectively, and the B.I. value of the peak of Tc attributable to the PPS resin component was 2.0. On the other hand, it was unable to clearly distinguish Tg of the PEEK resin component because it overlapped with the peak of Tc of the PPS resin component. COMPARATIVE EXAMPLE 3

Using the PPS resin and PEEK resin employed in Example 1, a biaxially-stretched film was obtained in a similar manner as in Example 1 except that the blending ratio of PEEK resin/PAS resin was changed to 4/6. The thus-obtained film was fixed on a metal frame and heat set at 340° C. for 10 minutes in a similar manner as in Example 2. Its physical properties were measured. Results are also given in Table 1.

Incidentally, each surface roughness Ra (μm) in Table 1 was measured by "SURFCOM 550A" (trade name; manufactured by Tokyo Seimitsu Co., Ltd.) in accordance with JIS B-0601.

Each dielectric constant and dielectric loss (tan δ) were measured at an electrode diameter of 18 mm, a heating rate of 2° C./min and a frequency of 100 Hz from room temperature to 200° C. in accordance with JIS C-2318 and C-2110 respectively.

Each coefficient of dynamic friction was measured in accordance with ASTM D-1894 by using a friction meter, Model TR, manufactured by Toyo Seiki Seisakusho, Ltd.

The solder heat resistance of each film was determined by dipping the film in a solder bath (260° C. ×10 seconds), measuring the length and width of the film both before and after the dipping and then calculating its shrinkage factor.

The breaking strength and elongation at break of each film were measured in air at 23° C., a sample length of 20 mm, a sample width of 10 mm and a stretching rate of 100 mm/min by a tensile tester ("Tensilon", trademark; manufactured by Toyo-Baldwin Company).

On the other hand, the Young's modulus of each film was measured under the same conditions as in the measurements of strength and elongation at break except that the stretching rate was changed to 10 mm/min.

Determination of fish-eyes in each film was effected by visually counting the number of fish-eyes greater than about 50 μm in its 10 cm×10 cm square sample under polarized light. Measurement was conducted at 5 different locations in the film, Their average value was used. The unit was converted to fish-eyes per m$^2$.

It is appreciated from Table 1 that the biaxially-stretched films of this invention were excellent in solder heat resistance, mechanical strength, surface smoothness, dimensional stability, electrical characteristics, moisture resistance, flex resistance and transparency. In contrast, the film of the PAS resin alone showed the large shrinkage factor in the solder bath and was hence inferior in solder heat resistance. On the other hand, the film of the PEEK resin alone was expensive and contained many fish-eyes formed around a heat deterioration product as a nuclei. In addition, the film of Comparative Example, which contained the PEEK resin in a small proportion and was outside the present invention, was inferior in solder heat resistance and was somewhat insufficient in mechanical strength too.

TABLE 1

|  | Example 1 | Example 2 | Example 3 | Example 4 | Comp. Ex. 1 | Comp. Ex. 2 | Comp. Ex. 3 |
| --- | --- | --- | --- | --- | --- | --- | --- |
| Various films | PEEK/PPS (6/4) | PEEK/PPS (6/4) | PEEK/PPS (6/4) | PEEK/PPS (8/2) | PPS | PEEK | PEEK/PPS (4/6) |
| Film thickness (m) | 10 | 10 | 10 | 10 | 10 | 11 | 12 |
| Shrinkage factor (%) in solder bath (260° C. × 10 sec) | 4.9 | 2.0 | 0 | 2.5 | 15.3 | 3.0 | 11.0 |
| Mechanical property |  |  |  |  |  |  |  |
| Breaking strength (Kg/mm$^2$) | 21 | 18 | 20 | 21 | 19 | 23 | 13 |
| Elongation at break (%) | 85 | 130 | 110 | 90 | 80 | 80 | 150 |
| Young's modulus (Kg/mm$^2$) | 400 | 380 | 390 | 320 | 380 | 270 | 250 |
| Transparency (light transmittance, %) | 82 | 82 | 82 | 83 | 85 | 84 | 84 |
| Surface roughness Ra (m) | 0.025 | 0.030 | 0.025 | 0.020 | 0.005 | 0.020 | 0.050 |
| Coefficient of dynamic friction | 0.40 | 0.38 | 0.41 | 0.45 | >>1 | 0.45 | 0.40 |
| Maximum value of dielectric loss (tan) from room to 200° C. (%) | 1.2 | 0.9 | 1.1 | 1.5 | 0.8 | 2.1 | 1.3 |
| Cost | Medium | Medium | Medium | High/medium | Low | High | Medium |
| B.I. of Tc$_1$ of PPS component | 1.0 | 1.0 | 1.0 | 2.0 | 0.2 | — | 0.22 |
| Fish-eyes (per m$^2$) | 100 | 150 | 150 | 300 | 100 | 800 | 150 |

EXAMPLE 5

PPS/PEEK compositions were obtained by using PPS resin and PEEK resin of the same types as those employed in Example 1, blending them at different blending ratios, separately melting and kneading the resultant blends at 370° C. in an extruder and then separately pelletizing the thus-formed melts. The blending PPS/PEEK ratios of the compositions were 80/20, 60/40, 50/50 and 40/60 respectively.

The compositions thus obtained in the form of pellets, the PPS resin alone and the PEEK resin alone were separately melt-extruded into a sheet-like form, followed by immediate chilling on casting rolls so that amorphous sheets of about 200 μm thick were produced separately.

Stretching temperatures at which the sheets of those compositions were successfully stretched to a high draw ratio most easily were determined by a simultaneous biaxial stretching machine manufactured by Toyo Seiki Seisakusho, Ltd. On the simultaneous biaxial stretching machine, the sheets were separately stretched 3.0 times in both the machine and transverse directions at their respective stretching temperatures so that biaxially-stretched films were obtained separately.

The thus-obtained biaxially-stretched films were fixed at the entire peripheries thereof on a metal frame and their heat setting was attempted for 10 minutes in a Geer oven. The upper limit of temperatures at which heat setting was feasible varied depending on the composition. Each film was therefore heat set at a temperature at which its sufficiently-stable heat setting appeared to be feasible.

Incidentally, the stretching temperature and heat setting temperature of each of the above films were as shown in Table 2.

TABLE 2

| Composition (PPS/PEEK) | Stretching temperature (°C.) | Heat setting temperature (°C.) |
|---|---|---|
| 100/0 | 105 | 260 |
| 80/20 | 115 | 270 |
| 60/40 | 125 | 300 |
| 50/50 | 140 | 310 |
| 40/60 | 145 | 340 |
| 0/100 | 150 | 340 |

Square samples of 5 cm×5 cm were cut out from the thus-obtained films respectively and were caused to float for 10 seconds on a solder bath controlled at a constant temperature. Swelling, shrinkage or the like of the film samples was observed. Temperatures at which the individual film samples developed no changes in external appearance were recorded as their respective solder-heat resistant temperatures. The relationship between the resin compositions and their corresponding solder-heat resistant temperatures is diagrammatically illustrated in FIG. 1.

As is apparent from FIG. 1, as the proportion of the PEEK resin increases, the curve of solder-heat resistant temperatures rapidly becomes steep so that the synergistic improvement in the solder heat resistance is envisaged.

What is claimed is:

1. A process for the production of a heat-resistant film, which comprises melt-extruding a composition at 350°–400°, said composition comprising (A) 50–90 parts by weight of a polyetheretherketone having predominant recurring units of the formula:

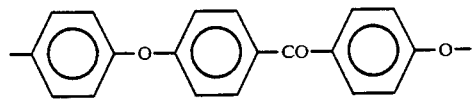

having a glass transition point of about 140° C.±10° C. and a melting point of about 340° C.±10° C., and (B) 50–10 parts by weight of a linear poly(arylene sulfide) having a melt viscosity of from 1,000 to 50,000 poises as measured at 310° C. and a shear rate of 200 second$^{-1}$ and being obtained by reacting a metal sulfide and a dihalogenated aromatic compound in the presence of water in an organic amide solvent, wherein said poly(arylene sulfide) is selected from poly(p-phenylene sulfide) and a copolymer of poly(p-phenylene sulfide) and m-phenylene sulfide, and then biaxially stretching the resulting sheet at a stretching temperature of 140°–150° C. and a draw ratio of at least 4.0 in terms of area ratio.

2. The process as claimed in claim 1, wherein the thus-stretched film is heat set at 250°–350° C.

3. The process as claimed in claim 1, wherein the composition of the polyetheretherketone and poly(arylene sulfide) is such that the broadened index of a peak in crystallization temperature, said peak being attributed to the poly(arylene sulfide) in the composition, is in a range of 0.35–5.00 and the term "broadened index" is defined by "half-value width of the peak/the height of the peak" of the crystallization temperature (Tc) of the poly(arylene sulfide) in a diagram obtained by measuring the composition at a heating rate of 10° C./min by means of a differential scanning calorimeter.

* * * * *